(12) United States Patent
Liou et al.

(10) Patent No.: US 10,643,350 B1
(45) Date of Patent: May 5, 2020

(54) AUTOFOCUS DETECTING DEVICE

(71) Applicant: Goldtek Technology Co., Ltd., New Taipei (TW)

(72) Inventors: Chih-Feng Liou, New Taipei (TW); Yen-Ching Lee, New Taipei (TW)

(73) Assignee: Goldtek Technology Co., Ltd., New Taipei (TW)

( * ) Notice: Subject to any disclaimer, the term of this patent is extended or adjusted under 35 U.S.C. 154(b) by 0 days.

(21) Appl. No.: 16/562,900

(22) Filed: Sep. 6, 2019

(30) Foreign Application Priority Data

Jan. 15, 2019 (TW) .............................. 108101566 A

(51) Int. Cl.
*G06T 7/80* (2017.01)
*G06T 7/00* (2017.01)
*G02B 7/04* (2006.01)
*G03B 13/36* (2006.01)

(52) U.S. Cl.
CPC .............. *G06T 7/80* (2017.01); *G06T 7/0002* (2013.01); *G02B 7/04* (2013.01); *G03B 13/36* (2013.01)

(58) Field of Classification Search
None
See application file for complete search history.

(56) References Cited

U.S. PATENT DOCUMENTS

| | | | | |
|---|---|---|---|---|
| 5,949,481 A * | 9/1999 | Sekine | ................. | G01S 3/7864 348/207.99 |
| 6,359,647 B1 * | 3/2002 | Sengupta | ......... | G08B 13/19608 348/154 |
| 6,774,945 B1 * | 8/2004 | Bohn | ....................... | G02B 7/28 348/345 |
| 7,215,362 B2 * | 5/2007 | Klose | .................. | H04N 9/3147 345/1.1 |
| 8,947,542 B2 * | 2/2015 | Clemente | ........... | H04N 1/00204 348/207.1 |
| 2005/0046698 A1 * | 3/2005 | Knight | .................. | H04N 5/232 348/157 |
| 2010/0045801 A1 * | 2/2010 | Lee | ........................ | G06K 9/228 348/207.1 |
| 2011/0102655 A1 * | 5/2011 | Fujiyama | ............. | G02B 27/646 348/302 |
| 2012/0098987 A1 * | 4/2012 | Tsuda | ................... | H04N 1/2141 348/222.1 |

(Continued)

*Primary Examiner* — Jefferey F Harold
*Assistant Examiner* — Mustafizur Rahman
(74) *Attorney, Agent, or Firm* — ScienBiziP, P.C.

(57) ABSTRACT

An autofocus detecting device includes a jig, a driving member, and a controller. The jig fixes a camera at a preset object distance. The controller controls the camera to capture an image. The controller calculates a resolution of the captured image and determines whether the image resolution reaches a preset resolution threshold value. If the image resolution of the captured image does not reach the preset resolution threshold value, the driving member rotates a lens of the camera, and controller controls the camera to capture a new image. The controller calculates the image resolution of the new captured image and determines if the image resolution of the new captured image reaches the preset resolution threshold value. The controller controls the driving member to rotate the lens until the image resolution of the captured image reaches the preset resolution threshold value or until the lens reaches a maximum focus.

12 Claims, 2 Drawing Sheets

(56) References Cited

U.S. PATENT DOCUMENTS

| | | | | |
|---|---|---|---|---|
| 2012/0099798 | A1* | 4/2012 | Saruta | G01B 11/002 |
| | | | | 382/203 |
| 2012/0120302 | A1* | 5/2012 | Kiyota | C12M 21/06 |
| | | | | 348/345 |
| 2012/0257086 | A1* | 10/2012 | Nakasugi | G06T 3/4038 |
| | | | | 348/239 |
| 2013/0033576 | A1* | 2/2013 | Myokan | H04N 13/239 |
| | | | | 348/46 |
| 2013/0033640 | A1* | 2/2013 | Lee | H04N 1/107 |
| | | | | 348/376 |
| 2013/0258140 | A1* | 10/2013 | Lipson | G03B 3/10 |
| | | | | 348/240.3 |
| 2013/0342692 | A1* | 12/2013 | Li | G01N 21/538 |
| | | | | 348/143 |
| 2014/0037135 | A1* | 2/2014 | Kutliroff | G06F 3/017 |
| | | | | 382/103 |
| 2014/0092253 | A1* | 4/2014 | Marty | G06T 7/70 |
| | | | | 348/157 |
| 2014/0368614 | A1* | 12/2014 | Imai | G01B 21/047 |
| | | | | 348/47 |
| 2015/0036001 | A1* | 2/2015 | Shibuno | H04N 5/23293 |
| | | | | 348/207.1 |
| 2015/0156485 | A1* | 6/2015 | Kravitz | H04N 17/002 |
| | | | | 348/187 |
| 2015/0348242 | A1* | 12/2015 | Molgaard | G06T 11/60 |
| | | | | 348/241 |
| 2016/0080707 | A1* | 3/2016 | Lee | H04N 9/045 |
| | | | | 348/273 |

\* cited by examiner

AUTOFOCUS DETECTING DEVICE

FIELD

The subject matter herein generally relates to autofocus devices, and more particularly to an autofocus detecting device for focusing an assembled camera and determining whether the camera is defective.

BACKGROUND

More and more consumer electronic products come equipped with one or more cameras to achieve image-recognition functions. Thus, images captured by the cameras need to be clear. Since not every camera is equipped with autofocus features, during manufacturing and assembling in the factory, the camera needs to be adjusted to an appropriate focal length suitable for intended use. However, judging whether the focal length of the camera is optimal is mainly determined by manual inspections, and the focal length is manually adjusted. Manual inspections and adjustments are prone to errors due to factors such as fatigue of the operators. Such a manufacturing method of cameras consumes human resources and production time which may be reduced.

BRIEF DESCRIPTION OF THE DRAWINGS

Implementations of the present disclosure will now be described, by way of embodiments, with reference to the attached figures.

DETAILED DESCRIPTION

Figure 1:
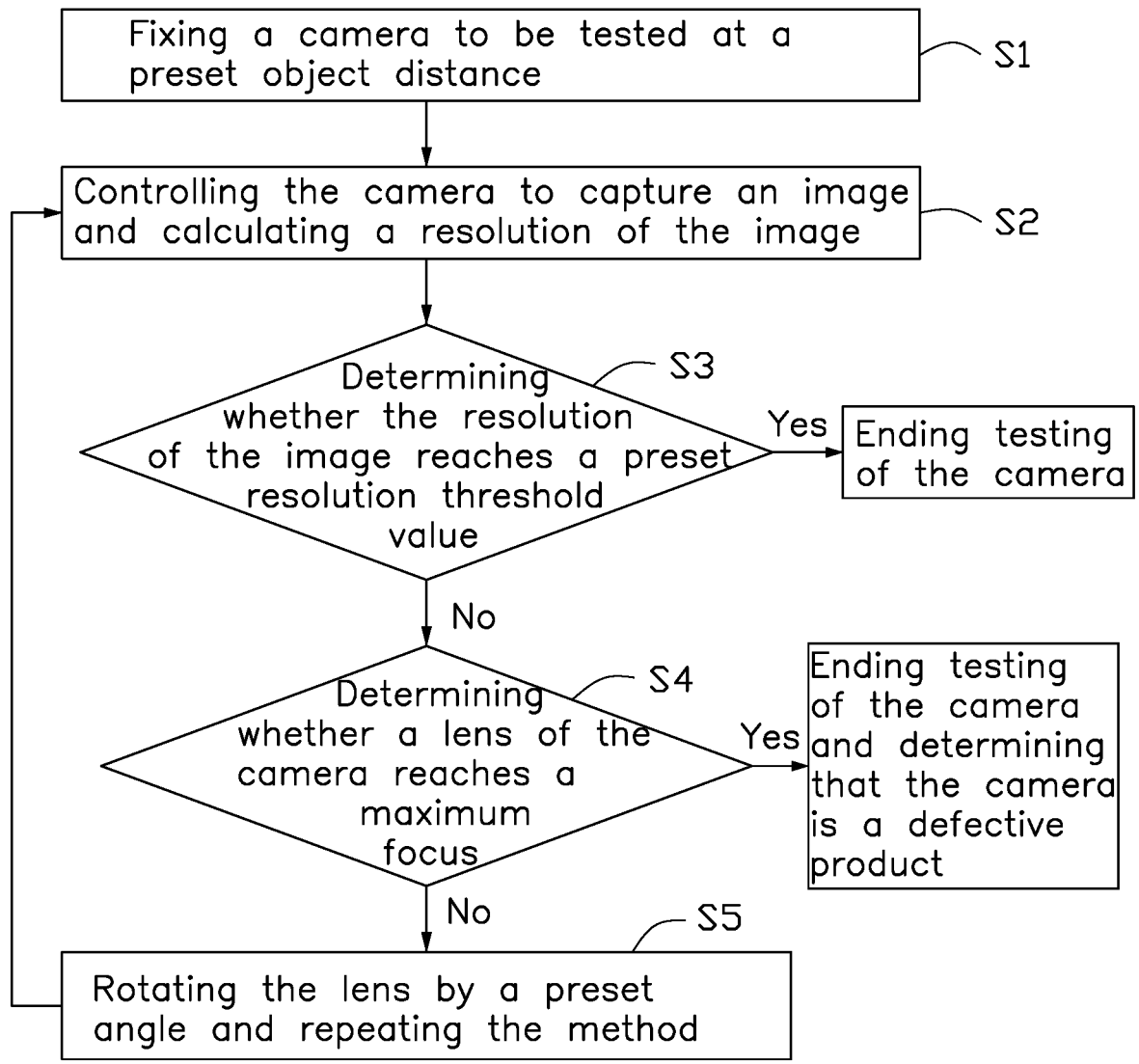
FIG. 1 is a flowchart of an autofocus detecting method for focusing an assembled camera and determining whether the camera is defective assembled.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 shows an embodiment of an autofocus detection method for focusing an assembled camera and determining whether the camera is defective.

At block S1, the camera to be tested is fixed at a preset object distance.

At block S2, the camera is controlled to capture an image, and an image resolution of the image is calculated.

At block S3, whether the image resolution reaches a preset resolution threshold value is determined. If the image resolution reaches the preset resolution threshold value, the autofocus detection method is completed. If the image resolution does not reach the preset resolution threshold value, block S4 is implemented.

At block S4, whether a lens of the camera reaches a maximum focus is determined. If the lens reaches the maximum focus, the camera is determined to be defective. If the lens does not reach the maximum focus, block S5 is implemented.

At block S5, the lens is rotated by a preset angle, and blocks S2-S4 are implemented again.

Specifically, the lens is first rotated along a first direction. If the image resolution after the lens is rotated by the preset angle does not reach the preset resolution threshold value, it is determined whether the image resolution after the lens is rotated by the preset angle is higher than the image resolution before the rotation. Otherwise, if the image resolution after the lens is rotated by the preset angle is lower than the image resolution before the rotation, the lens is rotated by the preset angle along a second direction opposite to the first direction.

It should be understood that when the lens is rotated, the image distance is changed, and a focal length of the camera correspondingly changes, thereby focusing the camera. In one embodiment, the first direction is a direction in which the image distance is increased, and the second direction is a direction in which the image distance is decreased. In other embodiments, the first direction may be the direction in which the image distance is decreased, and the second direction is the direction in which the image distance is increased.

In one embodiment, the image resolution is calculated according to a Laplace operator (Laplacian) calculating a variance of the image. A principle of sharpening an image according to a Laplacian is that when a gray level of a center pixel of an image field is lower than an average gray level of the other pixels in the image field, the gray level of the center pixel should be further decreased. When the gray level of the center pixel is higher than the average gray level of the other pixels in the image field, the gray level of the center pixel should be further increased to sharpen the image. The image resolution is calculated by taking the absolute value between the gray level of the center pixel and the gray level of the other pixels in the image field and calculating the variance (the square of the standard deviation). A higher variance represents a wider frequency response range and a more focused image. A lesser variance represents a narrower frequency response range and a less focused image.

It should be understood that the preset object distance can be set according to an actual situation of use of the camera. The preset resolution threshold value can be obtained from a standard sample camera capturing a test image at the preset object distance. The standard sample camera is a same type of camera as the camera to be tested. The preset angle can be set according to a rotatable range of the lens. When the rotatable range is large, the preset angle is large. When the rotatable range is small, the preset angle is small. In addition, the preset angle can also be set according to a focus adjustment accuracy requirement. When the focus adjustment accuracy requirement is higher, the preset angle is smaller. When the focus adjustment accuracy requirement is low, the preset angle can be higher.

In other embodiments, the autofocus detection method may further include issuing a prompt when the camera is determined to be defective. A prompt may include at least one of text, picture, sound, and light information. After issuing the prompt, relevant personnel can check the defective product to repair the defective product.

Figure 2:
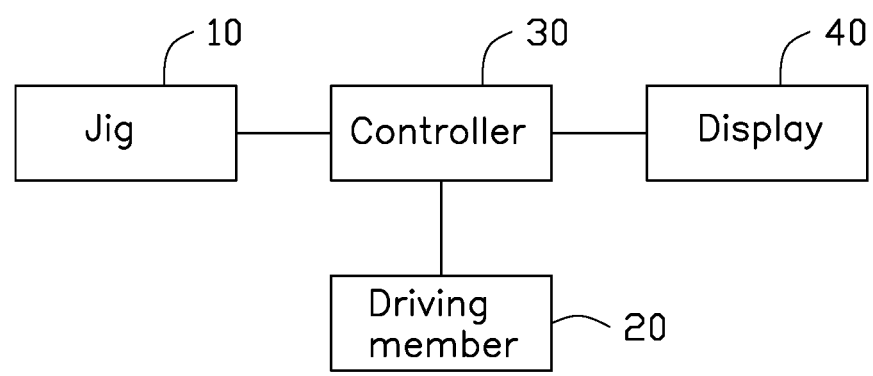
FIG. 2 is a block diagram of an autofocus detecting device.

FIG. 2 shows an embodiment of an autofocus detection device for focusing an assembled camera and determining whether the camera is defective. The autofocus detection device 100 includes a jig 10, a driving member 20, and a controller 30. The jig 10 and the driving member 20 are coupled to the controller 30 and controlled by the controller 30.

The jig 10 is configured to fix the camera to be tested at a preset object distance. The object distance refers to a distance between the camera fixed by the jig 10 and a test image. The controller 30 stores a preset resolution threshold value and is configured to control the camera to capture an image, calculate an image resolution of the image, and determine whether the image resolution reaches a preset resolution threshold value. The controller 30 is further configured to control the driving member 20 to drive a lens of the camera to rotate, capture a new image after the lens is rotated, calculate the image resolution of the new image, and determine whether the image resolution of the new image reaches the preset resolution threshold value. The controller 30 rotates the lens until the preset resolution threshold value is reached or the lens reaches a maximum focus.

The controller 30 can control the driving member 20 to rotate the lens along a first direction and a second direction. Specifically, the controller 30 controls the driving member 20 to first rotate the lens along the first direction. If the image resolution after the lens is rotated does not reach the preset resolution threshold value, the controller 30 determines whether the image resolution after rotation is higher than the image resolution before rotation. If the image resolution after rotation is less than the image resolution before rotation, the controller 30 controls the driving member 20 to rotate the lens along a second direction opposite to the first direction.

In one embodiment, the driving member 20 is a step motor.

The autofocus detection device 100 may further include a display 40. The display 40 is coupled to the controller 30, and the controller 30 can control the display 40 to display text or image prompt information to prompt the relevant personnel. The autofocus detecting device 100 may further include an alarm device (not shown). The alarm device is coupled to the controller 30, and the controller 30 can control the alarm device to emit sound or light prompt information to prompt the relevant personnel.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An autofocus detecting method for focusing a camera and determining whether the camera is defective, the autofocus detecting method comprising:
fixing a camera at a preset object distance;
controlling the camera to capture an image and calculating an image resolution of the image;
determining whether the image resolution reaches a preset resolution threshold value;
determining, when the image resolution reaches the preset resolution threshold value, that the camera is qualified;
determining, when the image resolution does not reach the preset resolution threshold value, whether a lens of the camera reaches a maximum focus;
determining, when the lens of the camera reaches the maximum focus, that the camera is defective; and
rotating the lens by a preset angle, when the lens does not reach the maximum focus, and repeating the autofocus detecting method until the image resolution reaches the preset resolution threshold value or until the lens of the camera reaches the maximum focus.

2. The autofocus detecting method of claim 1, wherein rotating the lens by the preset angle and repeating the autofocus detecting method comprises:
rotating the lens along a first direction;
determining, if the image resolution after the lens is rotated by the preset angle does not reach the preset resolution threshold value, whether the image resolution after the lens is rotated by the preset angle is higher than the image resolution before rotation;
continuing to rotate the lens by the preset angle along the first direction when the image resolution after the lens is rotated by the preset angle is higher than the image resolution before rotation; and
rotating the lens by the preset angle along a second direction opposite to the first direction if the image resolution after the lens is rotated by the preset angle is lower than the image resolution before rotation.

3. The autofocus detecting method of claim 2, wherein:
the first direction is a direction in which the object distance is increased; and
the second direction is a direction in which the object distance is decreased.

4. The autofocus detecting method of claim 1, wherein:
the image resolution is calculated according to a Laplace operator calculating a variance of the image.

5. The autofocus detecting method of claim 1 further comprising:
issuing a prompt when the camera is determined to be defective.

6. An autofocus detecting device comprising:
a jig configured to fix a camera to at a preset object distance;
a driving member; and
a controller configured to control the camera to capture an image; wherein:
the jig and the driving member are coupled to and controlled by the controller;
the controller stores a preset resolution threshold value;
the controller is configured to calculate an image resolution of the captured image and determine whether the image resolution reaches the preset resolution threshold value;
if the image resolution of the captured image does not reach the preset resolution threshold value, the controller is configured to control the driving member to rotate a lens of the camera, and the controller is configured to control the camera to capture a new image after the lens is rotated;
the controller is configured to calculate the image resolution of the new captured image and determine if the image resolution of the new captured image reaches the preset resolution threshold value;
the controller is configured to control the driving member to rotate the lens until the image resolution of the captured image reaches the preset resolution threshold value or until the lens reaches a maximum focus.

7. The autofocus detecting device of claim 6, wherein:
the controller is configured to control the driving member to rotate the lens of the camera along a first direction and a second direction.

8. The autofocus detecting device of claim 6, wherein:
the driving member is a step motor.

9. The autofocus detecting device of claim 6 further comprising a display coupled to the controller, wherein:
the controller is configured to control the display to display text or image prompt information.

10. The autofocus detecting device of claim 7, wherein:
the controller controls the driving member to rotate the lens by a preset angle along the first direction;
if the image resolution of the new captured image is higher than the image resolution of the previous captured image, the controller controls the driving member to continue to rotate the lens by the preset angle along the first direction;
if the image resolution of the new captured image is less than the image resolution of the previous captured image, the controller controls the driving member to rotate the lens by the preset angle along the second direction.

11. The autofocus detecting device of claim 10, wherein:
the first direction is opposite to the second direction.

12. The autofocus detecting device of claim 11, wherein:
the first direction is a direction in which the object distance is increased; and
the second direction is a direction in which the object distance is decreased.

* * * * *